United States Patent
Li (10) Patent No.: US 10,790,955 B2
(45) Date of Patent: Sep. 29, 2020

(54) RESERVATION OF HARQ-ACK RESOURCES IN UPLINK CONTROL INFORMATION IN WIRELESS COMMUNICATIONS

(71) Applicant: MediaTek Inc., Hsinchu (TW)

(72) Inventor: Xiu-Sheng Li, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 16/243,305

(22) Filed: Jan. 9, 2019

(65) Prior Publication Data

US 2019/0215127 A1 Jul. 11, 2019

Related U.S. Application Data

(60) Provisional application No. 62/616,030, filed on Jan. 11, 2018.

(51) Int. Cl.
*H04L 5/00* (2006.01)
*H04L 1/18* (2006.01)

(52) U.S. Cl.
CPC .......... *H04L 5/0055* (2013.01); *H04L 1/1812* (2013.01); *H04L 5/0051* (2013.01)

(58) Field of Classification Search
CPC ..... H04L 5/0007; H04B 7/2123; H04B 7/212; H04W 72/04; H04W 88/08; H04W 76/00;
(Continued)

(56) References Cited

U.S. PATENT DOCUMENTS 10,420,083 B2 * 9/2019 Bendlin ............... H04L 5/0051
2011/0228863 A1 * 9/2011 Papasakellariou ..........................
H04W 72/1263
375/259

(Continued)

FOREIGN PATENT DOCUMENTS

CN 104284429 A 1/2015
CN 107395329 A 11/2017
(Continued)

OTHER PUBLICATIONS

National Intellectual Property Administration of China, International Search Report and Written Opinion for International Application No. PCT/CN2019/071296, dated Apr. 2, 2019.
(Continued)

*Primary Examiner* — Brenda H Pham
(74) *Attorney, Agent, or Firm* — Han IP PLLC; Andy M. Han (57) ABSTRACT

Techniques and examples of reservation of hybrid automatic repeat request (HARQ) acknowledgment (HARQ-ACK) resources in UCI in wireless communications are described. Accordingly, a UE determines how a HARQ-ACK is to be transmitted to a network node of a wireless network. The UE reserves HARQ-ACK resources among a plurality of resource elements (REs) for a two-bit HARQ-ACK based on a result of the determining. The UE then transmits the HARQ-ACK, having zero bit, one bit or two bits, to the network node in a physical uplink shared channel (PUSCH) using the reserved HARQ-ACK resources such that the PUSCH is punctured for the HARQ-ACK.

13 Claims, 7 Drawing Sheets

(58) Field of Classification Search
CPC ..... H04W 84/08; H04W 76/02; H04W 84/12; H04W 74/0816; H04W 74/04; H04W 72/0406
USPC .......................... 370/208, 322, 329, 341, 348
See application file for complete search history.

(56) References Cited

U.S. PATENT DOCUMENTS

2011/0280346 A1* 11/2011 Yang .................... H04L 1/0045
375/341
2016/0374084 A1  12/2016 Zhang

FOREIGN PATENT DOCUMENTS

WO   WO 2014036909 A1   3/2014
WO   WO 2017160350 A1   9/2017

OTHER PUBLICATIONS

Huawei et al., Resource allocation for PUCCH HARQ-ACK feedback, 3GPP TSG RAN WG1 Meeting #91, Reno, USA, Nov. 27-Dec. 1, 2017.
Mediatek Inc., HARQ-ACK and UL Scheduling Timing Relationship, 3GPP TSG RAN WG1 Meeting 91, Reno, USA, Nov. 27-Dec. 1, 2017.

* cited by examiner

DETERMINE, BY A PROCESSOR OF A USER EQUIPMENT (UE), HOW A HYBRID AUTOMATIC REPEAT REQUEST (HARQ) ACKNOWLEDGMENT (HARQ-ACK) IS TO BE TRANSMITTED TO A NETWORK NODE OF A WIRELESS NETWORK
510

RESERVE, BY THE PROCESSOR, HARQ-ACK RESOURCES AMONG A PLURALITY OF RESOURCE ELEMENTS (REs) FOR A TWO-BIT HARQ-ACK BASED ON A RESULT OF THE DETERMINING
520

TRANSMIT, BY THE PROCESSOR, THE HARQ-ACK HAVING ZERO BIT, ONE BIT OR TWO BITS TO THE NETWORK NODE IN A PHYSICAL UPLINK SHARED CHANNEL (PUSCH) USING THE RESERVED HARQ-ACK RESOURCES SUCH THAT THE PUSCH IS PUNCTURED FOR THE HARQ-ACK
530

```
┌─────────────────────────────────────────────┐
│ RESERVE, BY A PROCESSOR OF A USER EQUIPMENT │
│ (UE), HYBRID AUTOMATIC REPEAT REQUEST (HARQ)│
│ ACKNOWLEDGEMENT (HARQ-ACK) RESOURCES        │
│ AMONG A PLURALITY OF RESOURCE ELEMENTS (REs)│
│ SUCH THAT PUNCTURING OF A FIRST PART OF CHANNEL │
│ STATE INFORMATION (CSI) ON A PHYSICAL UPLINK│
│ SHARED CHANNEL (PUSCH) BY A HARQ-ACK IS     │
│ AVOIDED                                     │
│ 610                                         │
└─────────────────────────────────────────────┘
                      │
                      ▼
┌─────────────────────────────────────────────┐
│ TRANSMIT, BY THE PROCESSOR, THE HARQ-ACK    │
│ HAVING ZERO BIT, ONE BIT OR TWO BITS AS PART OF │
│ UPLINK CONTROL INFORMATION (UCI) TO A NETWORK │
│ NODE OF A WIRELESS NETWORK USING THE RESERVED │
│ HARQ-ACK RESOURCES                          │
│ 620                                         │
└─────────────────────────────────────────────┘
```

FIG. 6

RESERVATION OF HARQ-ACK RESOURCES IN UPLINK CONTROL INFORMATION IN WIRELESS COMMUNICATIONS

CROSS REFERENCE TO RELATED PATENT APPLICATION

The present disclosure claims the priority benefit of U.S. Provisional Patent Application Nos. 62/616,030, filed on 11 Jan. 2018, the content of which is herein incorporated by reference in its entirety.

TECHNICAL FIELD

The present disclosure is generally related to wireless communications and, more particularly, to reservation of hybrid automatic repeat request (HARQ) acknowledgement (HARQ-ACK) resources in uplink control information (UCI) in wireless communications.

BACKGROUND

Unless otherwise indicated herein, approaches described in this section are not prior art to the claims listed below and are not admitted as prior art by inclusion in this section.

In $5^{th}$-Generation (5G) New Radio (NR) communication systems, UCI on physical uplink shared channel (PUSCH) is a supported feature. Depending on the number of information bits used as HARQ-ACK bits, HARQ-ACK can be achieved by either rate-matching or puncturing of the PUSCH. In the UCI, a user equipment (UE) can report measured channel state information (CSI) back to a network to which the UE is wirelessly connected. The CSI can be viewed as being constituted with a first part (part 1) and a second part (part 2) of information, with information in part 1 having higher importance than information in part 2. To avoid HARQ-ACK puncturing part 1 of CSI severely, it has been agreed in the 3rd-Generation Partnership Project (3GPP) specification that PUSCH is punctured for HARQ-ACK with up to two bits and that PUSCH is rate-matched for HARQ-ACK with more than two bits.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose a number of schemes to address how resources are reserved for HARQ-ACK in case that PUSCH is to be punctured for HARQ-ACK so that puncturing of CSI (part 1 in particular) by HARQ-ACK can be avoided. It is believed that overall system performance would be improved with implementation of one or more of the proposed schemes in accordance with the present disclosure.

In one aspect, a method may involve a processor of a UE determining how a HARQ-ACK is to be transmitted to a network node of a wireless network. The method may also involve the processor reserving HARQ-ACK resources among a plurality of resource elements (REs) for a two-bit HARQ-ACK based on a result of the determining. The method may further involve the processor transmitting the HARQ-ACK to the network node in a physical uplink shared channel (PUSCH) using the reserved HARQ-ACK resources in a way that the PUSCH is punctured for the HARQ-ACK.

In one aspect, a method may involve a processor of a UE reserving HARQ-ACK resources among a plurality of REs such that puncturing of CSI on a PUSCH by a HARQ-ACK is avoided. The method may also involve the processor transmitting the HARQ-ACK as part of UCI to a network node of a wireless network using the reserved HARQ-ACK resources.

In one aspect, an apparatus (e.g., a UE) may include a transceiver and a processor coupled to control the transceiver. The transceiver may be capable of communicating with a network node of a wireless network. The processor may be capable of reserving HARQ-ACK resources among a plurality of REs such that puncturing of CSI on a PUSCH by a HARQ-ACK is avoided. Moreover, the processor may be capable of transmitting, via the transceiver, the HARQ-ACK as part of UCI to the network node using the reserved HARQ-ACK resources.

It is noteworthy that, although description provided herein may be in the context of certain radio access technologies, networks and network topologies such as 5G NR, the proposed concepts, schemes and any variation(s)/derivative(s) thereof may be implemented in, for and by other types of radio access technologies, networks and network topologies such as, for example and without limitation, Long-Term Evolution (LTE), LTE-Advanced, LTE-Advanced Pro, and Internet-of-Things (IoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation to clearly illustrate the concept of the present disclosure.

DETAILED DESCRIPTION OF PREFERRED EMBODIMENTS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to reservation of HARQ-ACK resources in UCI in wireless communications. According to the present disclosure, a number of possible solutions may be implemented separately or jointly. That is, although these possible solutions may be described below separately, two or more of these possible solutions may be implemented in one combination or another.

Under a first proposed scheme in accordance with the present disclosure, a UE may reserve HARQ-ACK resources based on an assumption that two bits of information bits are used as HARQ-ACK bits. To aid understanding of the first proposed scheme, an illustrative and non-limiting example is provided in FIG. 1.

Figure 1:
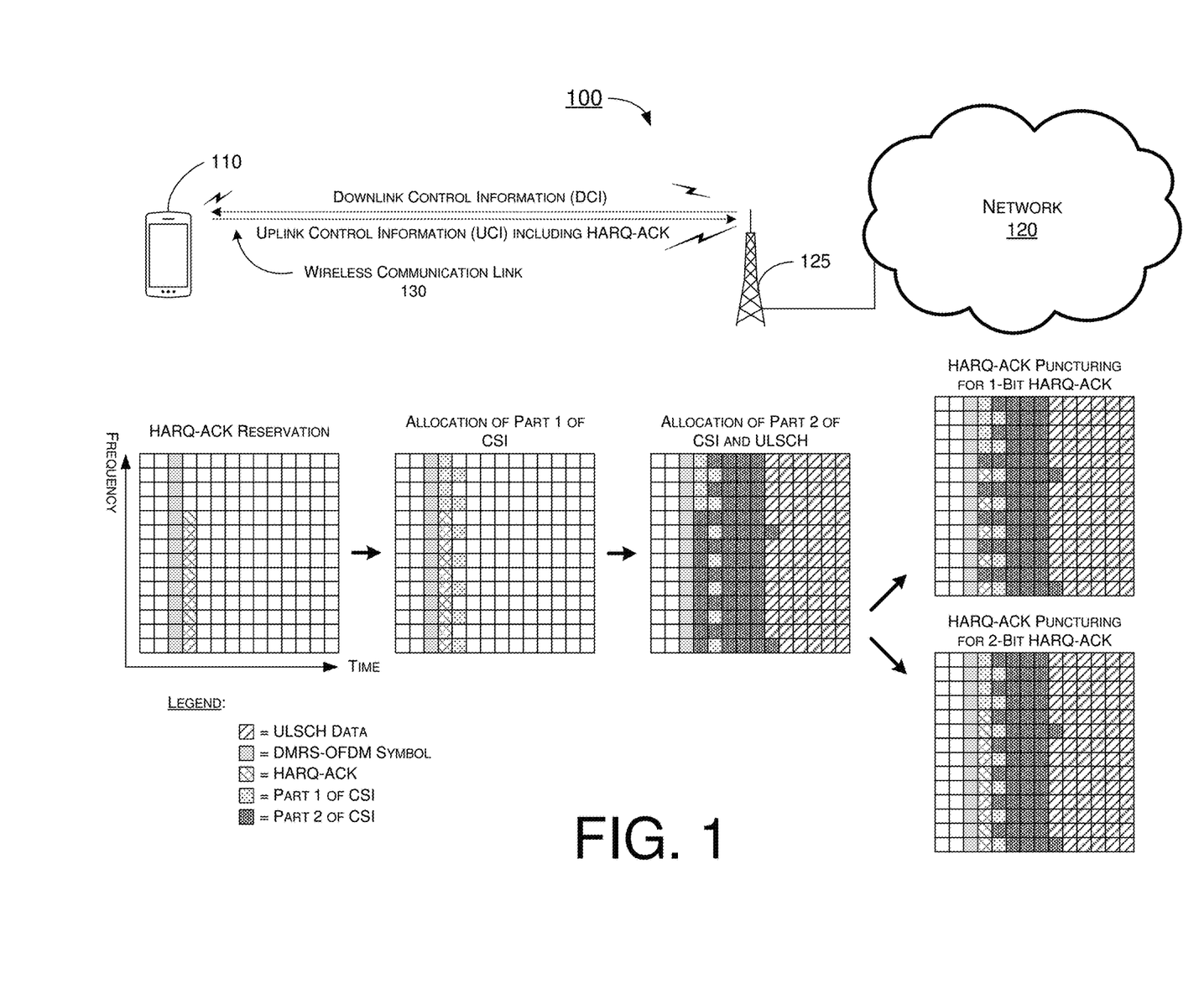
FIG. 1 is a diagram of an example scenario of reservation of HARQ-ACK resources in UCI under a first proposed scheme in accordance with the present disclosure.

FIG. 1 illustrates an example scenario 100 of reservation of HARQ-ACK resources in UCI under the first proposed scheme in accordance with the present disclosure. Scenario 100 may involve a UE 110 and a wireless communication network 120 (e.g., 5G/NR mobile network) having a network node 125 (e.g., gNB). UE 110 may establish a wireless communication link 130 with network 120 through network node 125 for uplink and downlink transmissions. In the context of 5G/NR, network node 125 may transmit downlink control information (DCI) via a physical downlink control channel (PDCCH), and UE 110 may transmit uplink control information (UCI) via a physical uplink control channel (PUCCH), or transmit UCI and/or data via a physical uplink shared channel (PUSCH). The UCI may include, for example and without limitation, channel state information (CSI), HARQ-ACK and scheduling request(s). Based on information (e.g., information related to HARQ) received from network 120 via network node 125, UE 110 may determine that a HARQ process is in effect in communicating with network node 125. For slot-based scheduling, UE 110 may transmit each HARQ-ACK by either rate-matching or puncturing of the PUSCH. In particular, for a given HARQ-ACK with more than two bits, UE 110 is to transmit the HARQ-ACK by rate-matching the PUSCH. Moreover, for a given HARQ-ACK with zero bit, one bit or two bits, UE 110 is to transmit the HARQ-ACK by puncturing the PUSCH.

Referring to FIG. 1, under the first proposed scheme in accordance with the present disclosure, upon determining either that no HARQ-ACK is required or that one-bit or two-bit HARQ-ACK is to be transmitted, UE 110 may reserve an amount of REs among a plurality of REs for a two-bit HARQ-ACK as HARQ-ACK resources, regardless of whether a one-bit HARQ-ACK or a two-bit HARQ-ACK is to be transmitted. Specifically, UE 110 may first reserve an entire orthogonal frequency-division multiplexing (OFDM) symbol equivalent of REs of the plurality of REs for a demodulation reference signal (DMRS). Next, UE 110 may reserve the HARQ-ACK resources among a remainder of the plurality of REs for a two-bit HARQ-ACK. Then, UE 110 may allocate a first number of REs among the remainder of the plurality of REs, excluding the HARQ-ACK resources, for a first part (part 1) of CSI. Subsequently, UE 110 may allocate a second number of REs among the remainder of the plurality of REs, including the HARQ-ACK resources, for a second part (part 2) of the CSI. This may result in some or all of those REs reserved as the HARQ-ACK resources to be allocated for part 2 of the CSI. Next, UE 110 may allocate a third number of REs among the remainder of the plurality of REs, including the remaining reserved HARQ-ACK resources (if any), for uplink shared channel (ULSCH) data. It is noteworthy that the mechanism is also applicable in an event that the waveform is Discrete Fourier Transform-spread-OFDM (DFT-S-OFDM).

Advantageously, under the first proposed scheme, when the actual HARQ-ACK that is transmitted is a one-bit HARQ-ACK, both part 1 and part 2 of the CSI may be decodable. This is because those REs allocated for part 1 of CSI are not punctured and those REs allocated for part 2 of CSI are minimally punctured and hence decodable. Also advantageously, even when the actual HARQ-ACK that is transmitted is a two-bit HARQ-ACK, both part 1 and part 2 of the CSI may be decodable. This is because those REs allocated for part 1 of CSI are not punctured and those REs allocated for part 2 of CSI are not so severely punctured and hence still decodable.

Under a second proposed scheme in accordance with the present disclosure, a fixed number of one or more entire orthogonal frequency-division multiplexing (OFDM) symbols (e.g., one entire OFDM symbol) may be reserved. In such cases, exception rule(s) may be required in an event that actual resources for HARQ-ACK are more than one OFDM symbol. For example, an exception rule may entail that actual resources for HARQ-ACK are limited to one OFDM symbol. As another example, an exception rule may entail that part 1 of CSI may be allowed to be punctured. To aid understanding of the second proposed scheme, an illustrative and non-limiting example is provided in FIG. 2.

Figure 2:
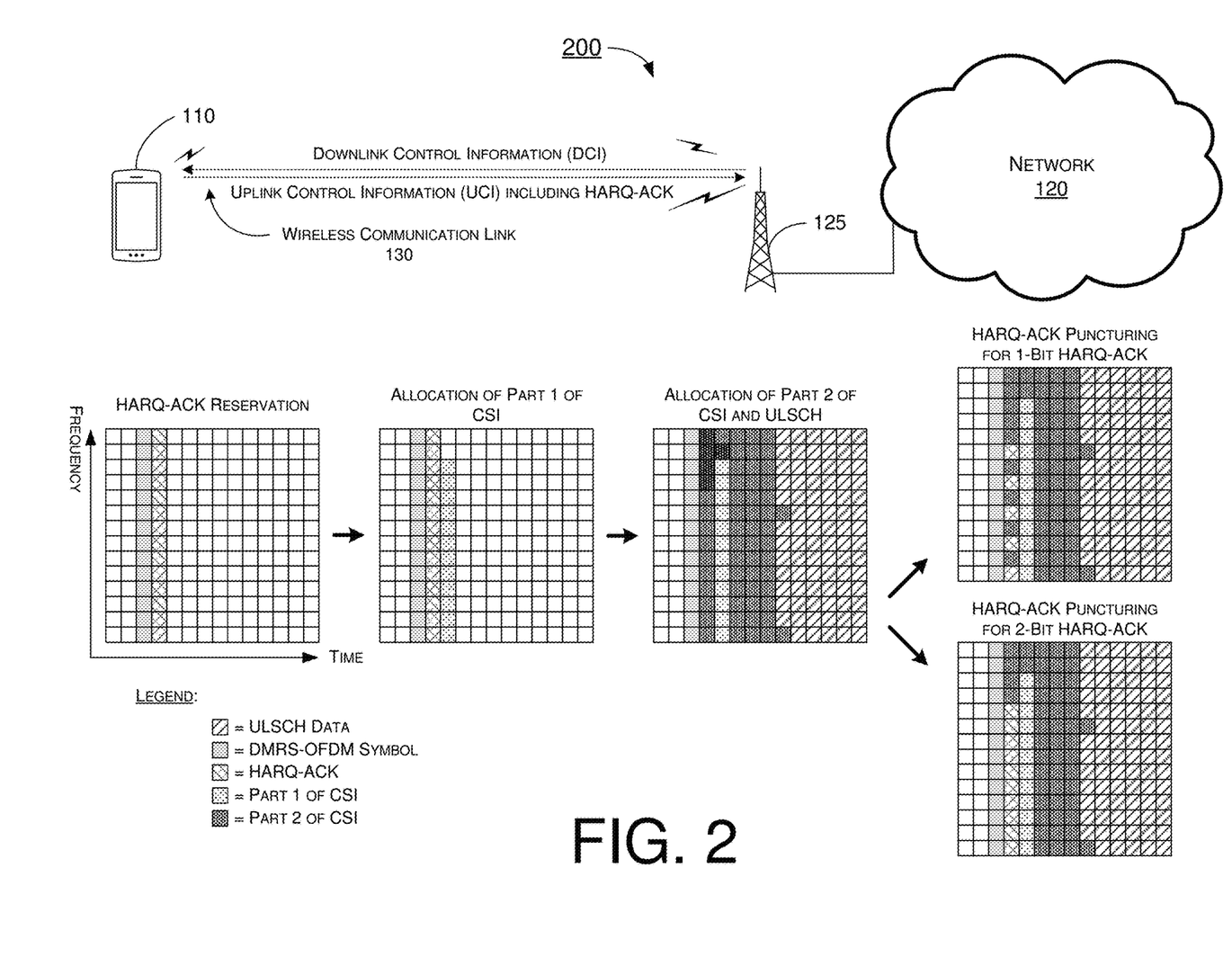
FIG. 2 is a diagram of an example scenario of reservation of HARQ-ACK resources in UCI under a second proposed scheme in accordance with the present disclosure.

FIG. 2 illustrates an example scenario 200 of reservation of HARQ-ACK resources in UCI under the second proposed scheme in accordance with the present disclosure. Scenario 200 may involve a UE 110 and a wireless communication network 120 (e.g., 5G/NR mobile network) having a network node 125 (e.g., gNB). UE 110 may establish a wireless communication link 130 with network 120 through network node 125 for uplink and downlink transmissions. In the context of 5G/NR, network node 125 may transmit DCI via a PDCCH, and UE 110 may transmit UCI and data via a PUSCH. The UCI may include, for example and without limitation, CSI, HARQ-ACK and scheduling request(s). Based on information (e.g., information related to HARQ) received from network 120 via network node 125, UE 110 may determine that a HARQ process is in effect in communicating with network node 125. For slot-based scheduling, UE 110 may transmit each HARQ-ACK by either rate-matching or puncturing of the PUSCH. In particular, for a given HARQ-ACK with more than two bits, UE 110 is to transmit the HARQ-ACK by rate-matching the PUSCH. Moreover, for a given HARQ-ACK with zero bit, one bit or two bits, UE 110 is to transmit the HARQ-ACK by puncturing the PUSCH.

Referring to FIG. 2, under the second proposed scheme in accordance with the present disclosure, upon determining either that no HARQ-ACK is required or that one-bit or two-bit HARQ-ACK is to be transmitted, UE 110 may reserve an amount of REs among a plurality of REs equivalent to at least one OFDM symbol as HARQ-ACK resources, regardless of whether a one-bit HARQ-ACK or a two-bit HARQ-ACK is to be transmitted. Specifically, UE 110 may first reserve an entire OFDM symbol equivalent of REs of the plurality of REs for a DMRS. Next, UE 110 may reserve one or more entire OFDM symbol(s) as the HARQ-ACK resources among a remainder of the plurality of REs. In the example shown in FIG. 2, one entire OFDM symbol is reserved as HARQ-ACK resources. Then, UE 110 may allocate a first number of REs among the remainder of the plurality of REs, excluding the HARQ-ACK resources, for a first part (part 1) of CSI. Subsequently, UE 110 may allocate a second number of REs among the remainder of the plurality of REs, including the HARQ-ACK resources, for a second part (part 2) of the CSI. This may result in some or all of those REs reserved as the HARQ-ACK resources to be allocated for part 2 of the CSI. Next, UE 110 may allocate a third number of REs among the remainder of the plurality of REs, including the remaining reserved HARQ-ACK resources (if any), for ULSCH data.

Under a third proposed scheme in accordance with the present disclosure, reservation of HARQ-ACK resources by a UE may be based on the understanding of HARQ-ACK bits by the UE. In an event that misunderstanding of HARQ-ACK bits exists between the UE and a network node (e.g., gNB or eNB) of a network to which the UE is wireless connected, it may be possible that part 1 of CSI would be almost undecodable. Moreover, decoding of part 2 of CSI as well as uplink shared channel (ULSCH) would likely result in failure. To aid understanding of the first approach of the third proposed scheme, an illustrative and non-limiting example is provided in FIG. 3A. Similarly, to aid understanding of the second approach of the third proposed scheme, an illustrative and non-limiting example is provided in FIG. 3B.

Figure 3A:
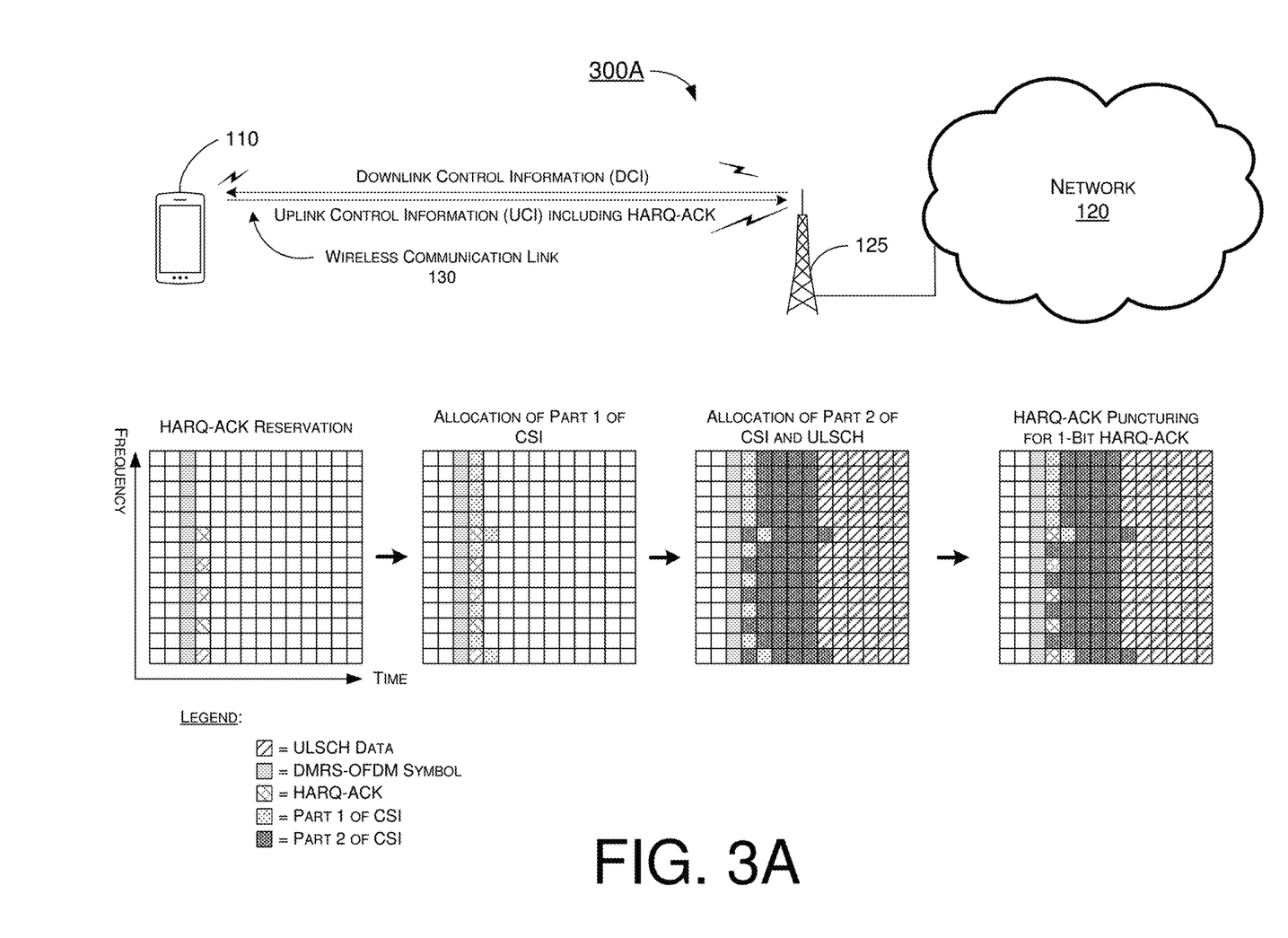
FIG. 3A is a diagram of an example scenario of reservation of HARQ-ACK resources in UCI under a first approach of a third proposed scheme in accordance with the present disclosure.

FIG. 3A illustrates an example scenario 300A of reservation of HARQ-ACK resources in UCI under a first approach of the third proposed scheme in accordance with the present disclosure. Scenario 300A may involve a UE 110 and a wireless communication network 120 (e.g., 5G/NR mobile network) having a network node 125 (e.g., gNB). UE 110 may establish a wireless communication link 130 with network 120 through network node 125 for uplink and downlink transmissions. In the context of 5G/NR, network node 125 may transmit DCI via a PDCCH, and UE 110 may transmit UCI and data via a PUSCH. The UCI may include, for example and without limitation, CSI, HARQ-ACK and scheduling request(s). Based on information (e.g., information related to HARQ) received from network 120 via network node 125, UE 110 may determine that a HARQ process is in effect in communicating with network node 125. For slot-based scheduling, UE 110 may transmit each HARQ-ACK by either rate-matching or puncturing of the PUSCH. In particular, for a given HARQ-ACK with more than two bits, UE 110 is to transmit the HARQ-ACK by rate-matching the PUSCH. Moreover, for a given HARQ-ACK with zero bit, one bit or two bits, UE 110 is to transmit the HARQ-ACK by puncturing the PUSCH.

Referring to FIG. 3A, under the first approach of the third proposed scheme in accordance with the present disclosure, UE 110 may reserve an amount of REs among a plurality of REs for a one-bit HARQ-ACK based on its understanding of the HARQ-ACK bits (e.g., according to a number of PDSCHs received from network node 125) that a one-bit HARQ-ACK is to be transmitted. It is noteworthy that, in an event that misunderstanding exists between UE 110 and network 120/network node 125 (e.g., a two-bit HARQ-ACK should be transmitted while UE 110 assumes that a one-bit HARQ-ACK is to be transmitted), part 1 of CSI may be almost undecodable while part of CSI and ULSCH data may be completely undecodable.

Figure 3B:
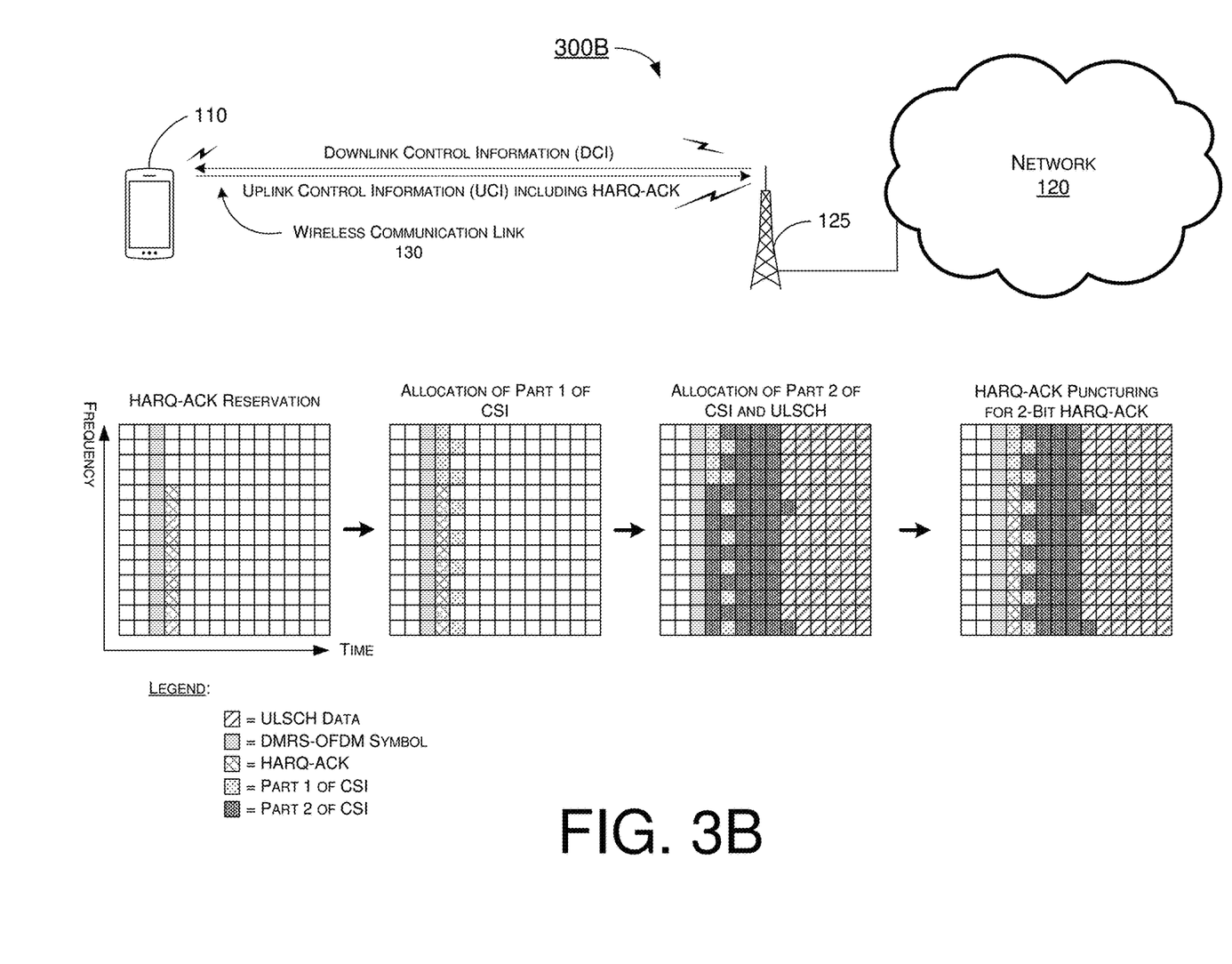
FIG. 3B is a diagram of an example scenario of reservation of HARQ-ACK resources in UCI under a second approach of the third proposed scheme in accordance with the present disclosure.

FIG. 3B illustrates an example scenario 300B of reservation of HARQ-ACK resources in UCI under a second approach of the third proposed scheme in accordance with the present disclosure. Scenario 300B may involve a UE 110 and a wireless communication network 120 (e.g., 5G/NR mobile network) having a network node 125 (e.g., gNB). UE 110 may establish a wireless communication link 130 with network 120 through network node 125 for uplink and downlink transmissions. In the context of 5G/NR, network node 125 may transmit DCI via a PDCCH, and UE 110 may transmit UCI and data via a PUSCH. The UCI may include, for example and without limitation, CSI, HARQ-ACK and scheduling request(s). Based on information (e.g., information related to HARQ) received from network 120 via network node 125, UE 110 may determine that a HARQ process is in effect in communicating with network node 125. For slot-based scheduling, UE 110 may transmit each HARQ-ACK by either rate-matching or puncturing of the PUSCH. In particular, for a given HARQ-ACK with more than two bits, UE 110 is to transmit the HARQ-ACK by rate-matching the PUSCH. Moreover, for a given HARQ-ACK with zero bit, one bit or two bits, UE 110 is to transmit the HARQ-ACK by puncturing the PUSCH.

Referring to FIG. 3B, under the second approach of the third proposed scheme in accordance with the present disclosure, UE 110 may reserve an amount of REs among a plurality of REs for a two-bit HARQ-ACK based on its understanding of the HARQ-ACK bits (e.g., according to a number of PDSCHs received from network node 125) that a two-bit HARQ-ACK is to be transmitted. It is noteworthy that, in an event that misunderstanding exists between UE 110 and network 120/network node 125 (e.g., a one-bit HARQ-ACK should be transmitted while UE 110 assumes that a two-bit HARQ-ACK is to be transmitted), part 1 of CSI may be almost undecodable while part of CSI and ULSCH data may be completely undecodable.

Illustrative Implementations

Figure 4:
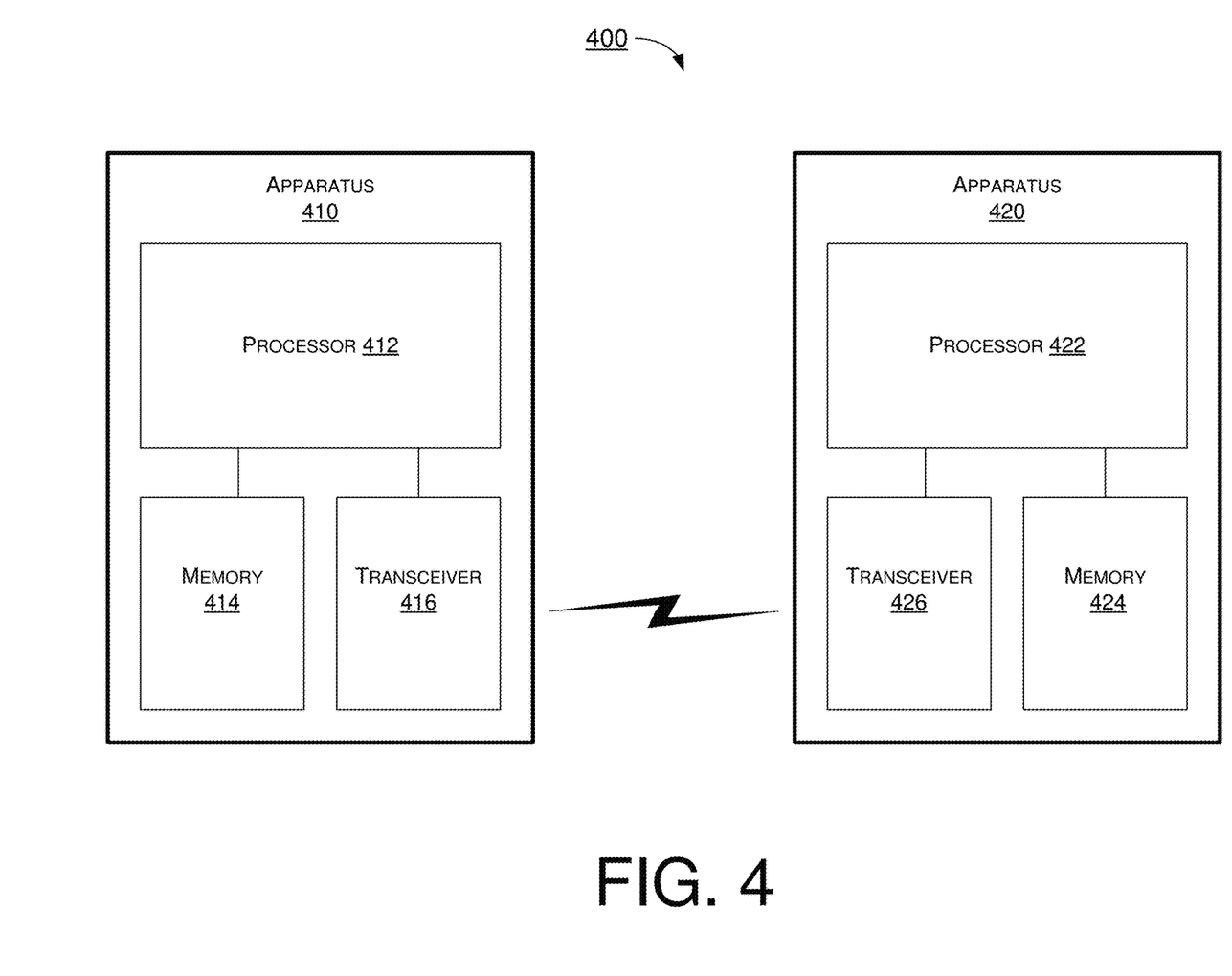
FIG. 4 is a block diagram of an example system in accordance with an implementation of the present disclosure.

FIG. 4 illustrates an example system 400 having at least an example apparatus 410 and an example apparatus 420 in accordance with an implementation of the present disclosure. Each of apparatus 410 and apparatus 420 may perform various functions to implement schemes, techniques, processes and methods described herein pertaining to reservation of HARQ-ACK resources in UCI in wireless communications, including the various schemes described above with respect to various proposed designs, concepts, schemes, systems and methods described above as well as processes 500 and 600 described below. For instance, apparatus 410 may be an example implementation of UE 110, and apparatus 420 may be an example implementation of network node 125.

Each of apparatus 410 and apparatus 420 may be a part of an electronic apparatus, which may be a network apparatus or a UE (e.g., UE 110), such as a portable or mobile apparatus, a wearable apparatus, a wireless communication apparatus or a computing apparatus. For instance, each of apparatus 410 and apparatus 420 may be implemented in a smartphone, a smart watch, a personal digital assistant, a digital camera, or a computing equipment such as a tablet computer, a laptop computer or a notebook computer. Each of apparatus 410 and apparatus 420 may also be a part of a machine type apparatus, which may be an IoT apparatus such as an immobile or a stationary apparatus, a home apparatus, a wire communication apparatus or a computing apparatus. For instance, each of apparatus 410 and apparatus 420 may be implemented in a smart thermostat, a smart fridge, a smart door lock, a wireless speaker or a home control center. When implemented in or as a network apparatus, apparatus 410 and/or apparatus 420 may be implemented in a network node (e.g., network node 125), such as an eNB in an LTE, LTE-Advanced or LTE-Advanced Pro network or in a gNB or TRP in a 5G network, an NR network or an IoT network.

In some implementations, each of apparatus 410 and apparatus 420 may be implemented in the form of one or more integrated-circuit (IC) chips such as, for example and without limitation, one or more single-core processors, one or more multi-core processors, or one or more complex-instruction-set-computing (CISC) processors. In the various schemes described above, each of apparatus 410 and apparatus 420 may be implemented in or as a network apparatus or a UE. Each of apparatus 410 and apparatus 420 may include at least some of those components shown in FIG. 4 such as a processor 412 and a processor 422, respectively, for example. Each of apparatus 410 and apparatus 420 may further include one or more other components not pertinent to the proposed scheme of the present disclosure (e.g., internal power supply, display device and/or user interface device), and, thus, such component(s) of apparatus 410 and apparatus 420 are neither shown in FIG. 4 nor described below in the interest of simplicity and brevity.

In one aspect, each of processor 412 and processor 422 may be implemented in the form of one or more single-core processors, one or more multi-core processors, or one or more CISC processors. That is, even though a singular term "a processor" is used herein to refer to processor 412 and processor 422, each of processor 412 and processor 422 may include multiple processors in some implementations and a single processor in other implementations in accordance with the present disclosure. In another aspect, each of processor 412 and processor 422 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 412 and processor 422 is a special-purpose machine specifically designed, arranged and configured to perform specific tasks including those pertaining to reservation of HARQ-ACK resources in UCI in wireless communications in accordance with various implementations of the present disclosure.

In some implementations, apparatus 410 may also include a transceiver 416 coupled to processor 412. Transceiver 416 may be capable of wirelessly transmitting and receiving data. In some implementations, apparatus 420 may also include a transceiver 426 coupled to processor 422. Transceiver 426 may include a transceiver capable of wirelessly transmitting and receiving data.

In some implementations, apparatus 410 may further include a memory 414 coupled to processor 412 and capable of being accessed by processor 412 and storing data therein. In some implementations, apparatus 420 may further include a memory 424 coupled to processor 422 and capable of being accessed by processor 422 and storing data therein. Each of memory 414 and memory 424 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 414 and memory 424 may include a type of read-only memory (ROM) such as mask ROM, programmable ROM (PROM), erasable programmable ROM (EPROM) and/or electrically erasable programmable ROM (EEPROM). Alternatively, or additionally, each of memory 414 and memory 424 may include a type of non-volatile random-access memory (NVRAM) such as flash memory, solid-state memory, ferroelectric RAM (Fe-RAM), magnetoresistive RAM (MRAM) and/or phase-change memory.

Each of apparatus 410 and apparatus 420 may be a communication entity capable of communicating with each other using various proposed schemes in accordance with the present disclosure. For illustrative purposes and without limitation, a description of capabilities of apparatus 410, as a UE (e.g., UE 110), and apparatus 420, as a network node (e.g., network node 125) or base station of a serving cell of a wireless network (e.g., network 120) such as a 5G/NR mobile network, is provided below. It is noteworthy that, although the example implementations described below are provided in the context of a UE, the same may be implemented in and performed by a base station. Thus, although the following description of example implementations pertains to apparatus 410 as a UE, the same is also applicable to apparatus 420 as a network node or base station (e.g., gNB or TRP).

In one aspect, processor 412 of apparatus 410 may determine how a HARQ-ACK is to be transmitted to apparatus 420. Additionally, processor 412 may reserve HARQ-ACK resources among a plurality of resource elements (REs) for a two-bit HARQ-ACK based on a result of the determining. Moreover, processor 412 may transmit, via transceiver 416, the HARQ-ACK, having zero bit, one bit or two bits, to apparatus 420 in a PUSCH using the reserved HARQ-ACK resources in a way the PUSCH is punctured for the HARQ-ACK.

In some implementations, with respect to the determining, processor 412 may perform a number of operations. For instance, processor 412 may determine that the HARQ-ACK is to be transmitted using zero bit, one bit or two bits of HARQ-ACK bits. Moreover, processor 412 may calculate an amount of REs of the plurality of REs for the reserved HARQ-ACK resources assuming the HARQ-ACK to be a two-bit HARQ-ACK.

In some implementations, with respect to the reserving, processor 412 may reserve a number of REs among the plurality of REs for a two-bit HARQ-ACK responsive to the determining indicating that no HARQ-ACK is to be transmitted or that the HARQ-ACK is to be transmitted using one bit or two bits of HARQ-ACK bits.

In some implementations, with respect to reserving, processor 412 may allocate the plurality of REs in an order as follows: (1) allocating a demodulation reference signal (DMRS); (2) reserving the HARQ-ACK resources among a remainder of the plurality of REs for a two-bit HARQ-ACK; (3) allocating a first number of REs among the remainder of the plurality of REs, excluding the HARQ-ACK resources, for a first part of CSI; (4) allocating a second number of REs among the remainder of the plurality of REs, including the HARQ-ACK resources, for a second part of the CSI in an event that the second part of the CSI exists; and (5) allocating a third number of REs among the remainder of the plurality of REs, including any remaining reserved HARQ-ACK resources, for uplink shared channel (ULSCH) data.

In another aspect, processor 412 of apparatus 410 may reserve HARQ-ACK resources among a plurality of REs such that puncturing of a first part of CSI on a PUSCH by a HARQ-ACK is avoided. Furthermore, processor 412 may transmit, via transceiver 416, the HARQ-ACK, having zero bit, one bit or two bits, as part of UCI to apparatus 420 using the reserved HARQ-ACK resources.

In some implementation, with respect to the reserving of the HARQ-ACK resources, processor 412 may perform a number of operations. For instance, processor 412 may calculate a number of REs of the plurality of REs used in transmitting the HARQ-ACK with two bits of information bits for the HARQ-ACK. Moreover, processor 412 may reserve the calculated number of REs among the plurality of REs for the HARQ-ACK.

In some implementation, with respect to the reserving of the HARQ-ACK resources, processor 412 may determine a number of information bits to be used in transmitting the HARQ-ACK on the PUSCH to be equal to or less than two bits. In some implementation, with respect to the reserving of the HARQ-ACK resources, processor 412 may also reserve the HARQ-ACK resources for a two-bit HARQ-ACK.

In some implementation, with respect to the reserving of the HARQ-ACK resources for the two-bit HARQ-ACK, processor 412 may allocate the plurality of REs in an order as follows: (1) allocating a DMRS; (2) reserving the HARQ-ACK resources among a remainder of the plurality of REs for a two-bit HARQ-ACK; (3) allocating a first number of REs among the remainder of the plurality of REs, excluding the HARQ-ACK resources, for a first part of CSI; (4) allocating a second number of REs among the remainder of the plurality of REs, including the HARQ-ACK resources, for a second part of the CSI in an event that the second part of the CSI exists; and (5) allocating a third number of REs among the remainder of the plurality of REs, including any remaining reserved HARQ-ACK resources, for ULSCH data.

In some implementation, with respect to the reserving of the HARQ-ACK resources, processor 412 may perform a number of operations. For instance, processor 412 may determine that the HARQ-ACK is to be transmitted using one bit of HARQ-ACK bits. Additionally, processor 412 may reserve an amount of REs of the plurality of REs for a one-bit HARQ-ACK.

In some implementation, with respect to the reserving of the HARQ-ACK resources, processor 412 may perform a number of operations. For instance, processor 412 may determine that the HARQ-ACK is to be transmitted using two bits of HARQ-ACK bits. Additionally, processor 412 may reserve an amount of REs of the plurality of REs for a two-bit HARQ-ACK.

In some implementation, with respect to the reserving of the HARQ-ACK resources, processor 412 may perform a number of operations. For instance, processor 412 may determine that the HARQ-ACK is to be transmitted using zero bit, one bit or two bits of HARQ-ACK bits. Moreover, processor 412 may reserve an amount of REs of the plurality of REs equivalent to at least one OFDM symbol.

Illustrative Processes

Figure 5:
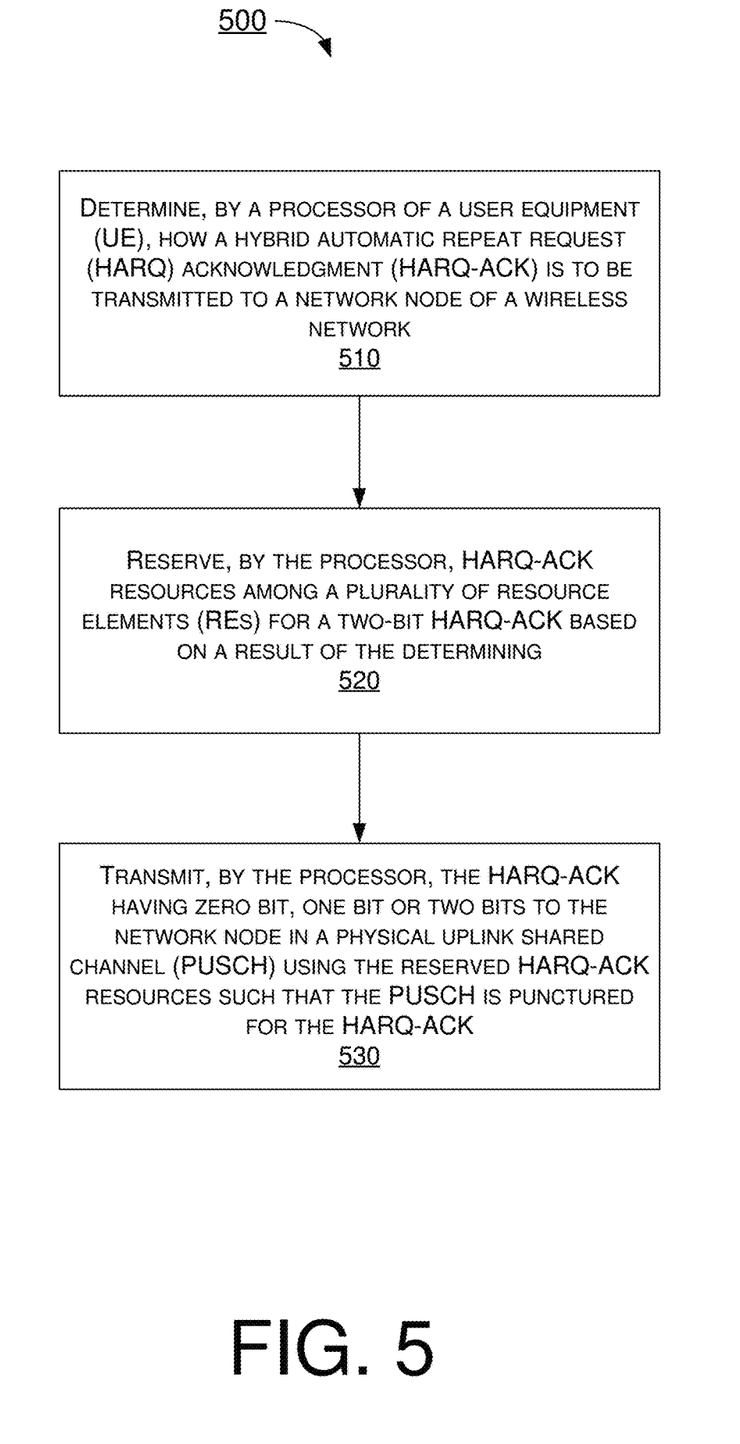
FIG. 5 is a flowchart of an example process in accordance with an implementation of the present disclosure.

FIG. 5 illustrates an example process 500 in accordance with an implementation of the present disclosure. Process 500 may represent an aspect of implementing various proposed designs, concepts, schemes, systems and methods described above. More specifically, process 500 may represent an aspect of the proposed concepts and schemes pertaining to reservation of HARQ-ACK resources in UCI in wireless communications. Process 500 may include one or more operations, actions, or functions as illustrated by one or more of blocks 510, 520 and 530. Although illustrated as discrete blocks, various blocks of process 500 may be divided into additional blocks, combined into fewer blocks, or eliminated, depending on the desired implementation. Moreover, the blocks/sub-blocks of process 500 may be executed in the order shown in FIG. 5 or, alternatively in a different order. The blocks/sub-blocks of process 500 may be executed iteratively. Process 500 may be implemented by or in apparatus 410 and apparatus 420 as well as any variations thereof. Solely for illustrative purposes and without limiting the scope, process 500 is described below in the context of apparatus 410 as a UE and apparatus 420 as a network node (e.g., gNB) of a wireless network (e.g., 5G/NR mobile network). Process 500 may begin at block 510.

At 510, process 500 may involve processor 412 of apparatus 410 determining how a HARQ-ACK is to be transmitted to apparatus 420. Process 500 may proceed from 510 to 520.

At 520, process 500 may involve processor 412 reserving HARQ-ACK resources among a plurality of resource elements (REs) for a two-bit HARQ-ACK based on a result of the determining. Process 500 may proceed from 520 to 530.

At 530, process 500 may involve processor 412 transmitting, via transceiver 416, the HARQ-ACK, having zero bit, one bit or two bits, to apparatus 420 in a PUSCH using the reserved HARQ-ACK resources in a way the PUSCH is punctured for the HARQ-ACK.

In some implementations, with respect to the determining, process 500 may involve processor 412 performing a number of operations. For instance, process 500 may involve processor 412 determining that the HARQ-ACK is to be transmitted using zero bit, one bit or two bits of HARQ-ACK bits. Moreover, process 500 may involve processor 412 calculating an amount of REs of the plurality of REs for the reserved HARQ-ACK resources assuming the HARQ-ACK to be a two-bit HARQ-ACK.

In some implementations, with respect to the reserving, process 500 may involve processor 412 reserving a number of REs among the plurality of REs for a two-bit HARQ-ACK responsive to the determining indicating that no HARQ-ACK is to be transmitted or that the HARQ-ACK is to be transmitted using one bit or two bits of HARQ-ACK bits.

In some implementations, with respect to reserving, process 500 may involve processor 412 allocating the plurality of REs in an order as follows: (1) allocating a demodulation reference signal (DMRS); (2) reserving the HARQ-ACK resources among a remainder of the plurality of REs for a two-bit HARQ-ACK; (3) allocating a first number of REs among the remainder of the plurality of REs, excluding the HARQ-ACK resources, for a first part of CSI; (4) allocating a second number of REs among the remainder of the plurality of REs, including the HARQ-ACK resources, for a second part of the CSI in an event that the second part of the CSI exists; and (5) allocating a third number of REs among the remainder of the plurality of REs, including any remaining reserved HARQ-ACK resources, for uplink shared channel (ULSCH) data.

Figure 6:
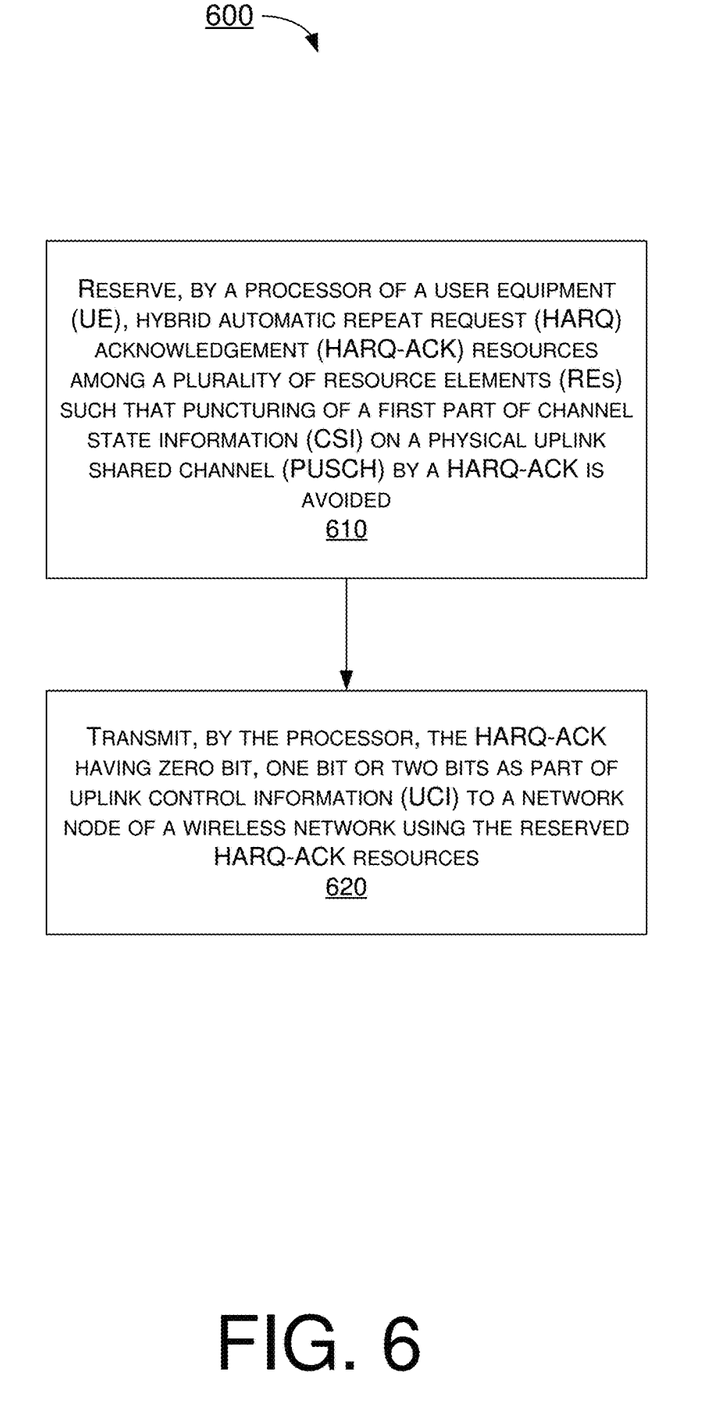
FIG. 6 is a flowchart of an example process in accordance with an implementation of the present disclosure.

FIG. 6 illustrates an example process 600 in accordance with an implementation of the present disclosure. Process 600 may represent an aspect of implementing various proposed designs, concepts, schemes, systems and methods described above. More specifically, process 600 may represent an aspect of the proposed concepts and schemes pertaining to reservation of HARQ-ACK resources in UCI in wireless communications. Process 600 may include one or more operations, actions, or functions as illustrated by one or more of blocks 610 and 620. Although illustrated as discrete blocks, various blocks of process 600 may be divided into additional blocks, combined into fewer blocks, or eliminated, depending on the desired implementation. Moreover, the blocks/sub-blocks of process 600 may be executed in the order shown in FIG. 6 or, alternatively in a different order. The blocks/sub-blocks of process 600 may be executed iteratively. Process 600 may be implemented by or in apparatus 410 and apparatus 420 as well as any variations thereof. Solely for illustrative purposes and without limiting the scope, process 600 is described below in the context of apparatus 410 as a UE and apparatus 420 as a network node (e.g., gNB) of a wireless network (e.g., 5G/NR mobile network). Process 600 may begin at block 610.

At 610, process 600 may involve processor 412 of apparatus 410 reserving HARQ-ACK resources among a plurality of REs such that puncturing of a first part of CSI on a PUSCH by a HARQ-ACK is avoided. Process 600 may proceed from 610 to 620.

At 620, process 600 may involve processor 412 transmitting, via transceiver 416, the HARQ-ACK, having zero bit, one bit or two bits, as part of UCI to apparatus 420 using the reserved HARQ-ACK resources.

In some implementation, with respect to the reserving of the HARQ-ACK resources, process 600 may involve processor 412 performing a number of operations. For instance, process 600 may involve processor 412 calculating a number of REs of the plurality of REs used in transmitting the HARQ-ACK with two bits of information bits for the HARQ-ACK. Moreover, process 600 may involve processor 412 reserving the calculated number of REs among the plurality of REs for the HARQ-ACK.

In some implementation, with respect to the reserving of the HARQ-ACK resources, process 600 may involve processor 412 determining a number of information bits to be used in transmitting the HARQ-ACK on the PUSCH to be equal to or less than two bits. In some implementation, with respect to the reserving of the HARQ-ACK resources, process 600 may further involve processor 412 reserving the HARQ-ACK resources for a two-bit HARQ-ACK.

In some implementation, with respect to the reserving of the HARQ-ACK resources for the two-bit HARQ-ACK, process 600 may involve processor 412 allocating the plurality of REs in an order as follows: (1) allocating a DMRS; (2) reserving the HARQ-ACK resources among a remainder of the plurality of REs for a two-bit HARQ-ACK; (3) allocating a first number of REs among the remainder of the plurality of REs, excluding the HARQ-ACK resources, for a first part of CSI; (4) allocating a second number of REs among the remainder of the plurality of REs, including the HARQ-ACK resources, for a second part of the CSI in an event that the second part of the CSI exists; and (5) allocating a third number of REs among the remainder of the plurality of REs, including any remaining reserved HARQ-ACK resources, for ULSCH data.

In some implementation, with respect to the reserving of the HARQ-ACK resources, process 600 may involve processor 412 performing a number of operations. For instance, process 600 may involve processor 412 determining that the HARQ-ACK is to be transmitted using one bit of HARQ-ACK bits. Additionally, process 600 may involve processor 412 reserving an amount of REs of the plurality of REs for a one-bit HARQ-ACK.

In some implementation, with respect to the reserving of the HARQ-ACK resources, process 600 may involve processor 412 performing a number of operations. For instance, process 600 may involve processor 412 determining that the HARQ-ACK is to be transmitted using two bits of HARQ-ACK bits. Additionally, process 600 may involve processor 412 reserving an amount of REs of the plurality of REs for a two-bit HARQ-ACK.

In some implementation, with respect to the reserving of the HARQ-ACK resources, process 600 may involve processor 412 performing a number of operations. For instance, process 600 may involve processor 412 determining that the HARQ-ACK is to be transmitted using zero bit, one bit or two bits of HARQ-ACK bits. Moreover, process 600 may involve processor 412 reserving an amount of REs of the plurality of REs equivalent to at least one OFDM symbol.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
   determining, by a processor of a user equipment (UE), how a hybrid automatic repeat request (HARQ) acknowledgment (HARQ-ACK) is to be transmitted to a network node of a wireless network;
   reserving, by the processor, HARQ-ACK resources among a plurality of resource elements (REs) for a two-bit HARQ-ACK based on a result of the determining; and
   transmitting, by the processor, the HARQ-ACK having zero bit, one bit or two bits to the network node in a physical uplink shared channel (PUSCH) using the reserved HARQ-ACK resources,
   wherein the reserving comprises reserving a number of REs among the plurality of REs for a two-bit HARQ-ACK as if the HARQ-ACK is to be transmitted using two bits regardless of whether the determining indicates that no HARQ-ACK is to be transmitted or that the HARQ-ACK is to be transmitted using one bit or two bits of HARQ-ACK bits,
   wherein the PUSCH is punctured for the HARQ-ACK such that a first part of information transmitted in the PUSCH is not punctured while a second part of the information transmitted in the PUSCH is punctured in case the HARQ-ACK is transmitted using one bit or two bits, and
   wherein the second part of the information is based on the first part of the information.

2. The method of claim 1, wherein the determining comprises:
   determining that the HARQ-ACK is to be transmitted using zero bit, one bit or two bits of HARQ-ACK bits; and
   calculating an amount of REs of the plurality of REs for the reserved HARQ-ACK resources assuming the HARQ-ACK to be a two-bit HARQ-ACK.

3. The method of claim 1, wherein the reserving further comprises allocating the plurality of REs in an order as follows:
   allocating a demodulation reference signal (DMRS);
   reserving the HARQ-ACK resources among a remainder of the plurality of REs for a two-bit HARQ-ACK;
   allocating a first number of REs among the remainder of the plurality of REs, excluding the HARQ-ACK resources, for a first part of channel state information (CSI);
   allocating a second number of REs among the remainder of the plurality of REs, including the HARQ-ACK resources, for a second part of the CSI in an event that the second part of the CSI exists; and
   allocating a third number of REs among the remainder of the plurality of REs, including any remaining reserved HARQ-ACK resources, for uplink shared channel (ULSCH) data.

4. A method, comprising:
   reserving, by a processor of a user equipment (UE), hybrid automatic repeat request (HARQ) acknowledgement (HARQ-ACK) resources among a plurality of resource elements (REs) such that puncturing of a first part of channel state information (CSI) on a physical uplink shared channel (PUSCH) by a HARQ-ACK is avoided; and
   transmitting, by the processor, the HARQ-ACK having zero bit, one bit or two bits as part of uplink control information (UCI) to a network node of a wireless network using the reserved HARQ-ACK resources,
   wherein the reserving comprises reserving a number of REs among the plurality of REs for a two-bit HARQ-ACK as if the HARQ-ACK is to be transmitted using two bits regardless of whether the determining indicates that no HARQ-ACK is to be transmitted or that the HARQ-ACK is to be transmitted using one bit or two bits of HARQ-ACK bits,
   wherein a second part of the CSI is punctured while the first part of the CSI is not punctured in case the HARQ-ACK is transmitted using one bit or two bits, and
   wherein the second part of the CSI is based on the first part of the CSI.

5. The method of claim 4, wherein the reserving of the HARQ-ACK resources further comprises:

calculating a number of REs of the plurality of REs used in transmitting the HARQ-ACK with two bits of information bits for the HARQ-ACK; and reserving the calculated number of REs among the plurality of REs for the HARQ-ACK.

6. The method of claim 4, wherein the reserving of the HARQ-ACK resources further comprises determining a number of information bits to be used in transmitting the HARQ-ACK on the PUSCH to be equal to or less than two bits.

7. The method of claim 4, wherein the reserving of the HARQ-ACK resources for the two-bit HARQ-ACK further comprises allocating the plurality of REs in an order as follows:

allocating a demodulation reference signal (DMRS);

reserving the HARQ-ACK resources among a remainder of the plurality of REs for a two-bit HARQ-ACK;

allocating a first number of REs among the remainder of the plurality of REs, excluding the HARQ-ACK resources, for the first part of the CSI;

allocating a second number of REs among the remainder of the plurality of REs, including the HARQ-ACK resources, for the second part of the CSI in an event that the second part of the CSI exists; and allocating a third number of REs among the remainder of the plurality of REs, including any remaining reserved HARQ-ACK resources, for uplink shared channel (ULSCH) data.

8. The method of claim 4, wherein the reserving of the HARQ-ACK resources further comprises:

determining that the HARQ-ACK is to be transmitted using zero bit, one bit or two bits of HARQ-ACK bits; and reserving an amount of REs of the plurality of REs equivalent to at least one orthogonal frequency-division multiplexing (OFDM) symbol.

9. An apparatus, comprising:

a transceiver capable of communicating with a network node of a wireless network; and a processor coupled to control the transceiver, the processor capable of:

reserving hybrid automatic repeat request (HARQ) acknowledgement (HARQ-ACK) resources among a plurality of resource elements (REs) such that puncturing of channel state information (CSI) on a physical uplink shared channel (PUSCH) by a HARQ-ACK is avoided; and transmitting, via the transceiver, the HARQ-ACK having zero bit, one bit or two bits as part of uplink control information (UCI) to the network node using the reserved HARQ-ACK resources, wherein, in reserving, the processor is configured to reserve a number of REs among the plurality of REs for a two-bit HARQ-ACK as if the HARQ-ACK is to be transmitted using two bits regardless of whether the determining indicates that no HARQ-ACK is to be transmitted or that the HARQ-ACK is to be transmitted using one bit or two bits of HARQ-ACK bits, wherein a second part of the CSI is punctured while the first part of the CSI is not punctured in case the HARQ-ACK is transmitted using one bit or two bits, and wherein the second part of the CSI is based on the first part of the CSI.

10. The apparatus of claim 9, wherein, in reserving the HARQ-ACK resources, the processor is further configured to perform operations comprising:

calculating a number of REs of the plurality of REs used in transmitting the HARQ-ACK with two bits of information bits for the HARQ-ACK; and reserving the calculated number of REs among the plurality of REs for the HARQ-ACK.

11. The apparatus of claim 9, wherein, in reserving the HARQ-ACK resources, the processor is further configured to determine a number of information bits to be used in transmitting the HARQ-ACK on the PUSCH to be equal to or less than two bits.

12. The apparatus of claim 9, wherein, in reserving the HARQ-ACK resources for the two-bit HARQ-ACK, the processor is further configured to allocate the plurality of REs in an order as follows:

allocating a demodulation reference signal (DMRS);

reserving the HARQ-ACK resources among a remainder of the plurality of REs for a two-bit HARQ-ACK;

allocating a first number of REs among the remainder of the plurality of REs, excluding the HARQ-ACK resources, for the first part of the CSI;

allocating a second number of REs among the remainder of the plurality of REs, including the HARQ-ACK resources, for the second part of the CSI in an event that the second part of the CSI exists; and allocating a third number of REs among the remainder of the plurality of REs, including any remaining reserved HARQ-ACK resources, for uplink shared channel (ULSCH) data.

13. The apparatus of claim 9, wherein, in reserving the HARQ-ACK resources, the processor is further configured to perform operations comprising:

determining that the HARQ-ACK is to be transmitted using zero bit, one bit or two bits of HARQ-ACK bits; and reserving an amount of REs of the plurality of REs equivalent to at least one orthogonal frequency-division multiplexing (OFDM) symbol.

* * * * *